United States Patent [19]
Weppner et al.

[11] Patent Number: 5,504,977
[45] Date of Patent: Apr. 9, 1996

[54] DEVICE FOR RELEASABLY HOLDING CORDS

[75] Inventors: Mark H. Weppner, Williamsville, N.Y.; J. Patrick Nugent, Greensboro, N.C.; Alfred R. VanLandingham, Jr., Knoxville, Tenn.

[73] Assignee: Newell Operating Company, Freeport, Ill.

[21] Appl. No.: 414,589

[22] Filed: Mar. 31, 1995

Related U.S. Application Data

[63] Continuation of Ser. No. 328,104, Oct. 24, 1994.

[51] Int. Cl.⁶ .............................. E06B 9/00; F16G 11/00
[52] U.S. Cl. .................... 24/115 R; 24/115 F; 24/115 H; 24/114.5; 160/178.1; 16/122
[58] Field of Search .................. 24/115 R, 115 F, 24/115 H, 115 K, 115 M, 130, 129 A, 122.6, 128, 127, 716, 114.5; 160/168.1 R, 178.1 R; 16/114 B, 122, 123

[56] References Cited

U.S. PATENT DOCUMENTS

| | | | |
|---|---|---|---|
| 578,228 | 3/1897 | Foster | 24/115 R |
| 1,278,641 | 9/1918 | Hancox | 24/115 R |
| 2,592,696 | 4/1952 | Hoody | 24/115 F |
| 2,991,112 | 7/1961 | Hopper | 24/115 F |
| 3,364,500 | 1/1968 | Fox | 24/115 H |
| 3,912,140 | 10/1975 | Franges | 16/114 B |
| 4,477,947 | 10/1984 | Lyons | 24/115 F |
| 4,909,298 | 3/1990 | Langhart et al. | 160/178.1 R |

FOREIGN PATENT DOCUMENTS

0342429  4/1956  Switzerland ................. 24/115 R

*Primary Examiner*—Victor N. Sakran
*Attorney, Agent, or Firm*—Foley & Lardner

[57] ABSTRACT

A device for releasably holding at least two cords includes an aperture for receiving a first cord and an elongated slot for releasably receiving a second cord. The device further includes an engagement surface below the aperture for contacting and retaining an enlarged region of the first cord. An inclined biasing surface at least partially below the slot contacts an enlarged region of the second cord and urges the second cord into a stable position. The second cord may be released from the device via the slot by sliding the enlarged region of the second cord along the biasing surface in response to a force tending to separate the cords. The aperture and the slot are preferably formed in inclined upper walls meeting in an apex region and the biasing surface is preferably spaced from the upper wall of the device in which the elongated slot is formed. The device may be made, such as by injection molding, as a single piece or as two mating halves.

20 Claims, 7 Drawing Sheets

DEVICE FOR RELEASABLY HOLDING CORDS

CROSS REFERENCE TO RELATED APPLICATIONS

This is a continuation-in-part of U.S. Patent application Ser. No. 08/328,104, entitled "Cord Release Device" filed on Oct. 24, 1994 in the name of Mark H. Weppner.

BACKGROUND OF THE INVENTION

1. Field of the Invention

The present invention relates generally to an improved device for releasably holding cords, such as draw strings and actuating cords for window coverings. More particularly, the invention relates to a device for holding such cords in a normal operating position, wherein the cords may be pulled and relaxed simultaneously, such as to raise and lower a blind or shade, but which allows one of the cords to escape from the device when a separating force is exerted between the cords.

2. Description of Related Art

In devices such as blinds, curtains and other window coverings, adjustments are typically made by manipulating cords, chains or strings. In a typical window blind, for instance, the position of the blind over a window and the orientation of light control blades are set by pulling or relaxing cords coupled to the blinds through pulleys in the headrail of the blind unit. Because such adjustments generally require pulling or relaxing a pair of cords simultaneously, such cords have traditionally been paired, such as in a continuous loop suspended from the headrail. However, the window coverings industry is generally moving away from such looped cords due to the hazards they present, particularly for small children who may inadvertently become entangled in the loop. As a result, a number of alternatives are being explored for releasably attaching the cord ends together, thereby permitting simultaneous manipulation of the cords, while allowing the cords to be separated when a force is exerted between them.

In one known device, separate, mating elements are attached to each cord end and the elements may be clipped or snapped into engagement with one another to join the cords. When a separating force is exerted between the cords, the elements snap apart, freeing the cords from one another. A device generally of this type is described in U.S. Pat. No. 4,909,298. Although such devices may generally be effective at releasably securing the cords together, they do not offer a particularly aesthetic solution to the problem, nor one that lends itself well to known mass production techniques. Moreover, a variety of other releasable cord coupling devices have been proposed, such as in co-pending patent application no. 08/328,104 filed on Oct. 24, 1994 and entitled "Cord Release Device," the entire disclosure of which is hereby incorporated herein by reference. However, despite such innovations in the art, there remains a need for a reliable device having a pleasing appearance and, at the same time, a relatively simple structure that can be readily mass produced at a reasonable cost. In particular, there is a need for a device that can effectively hold at least two cords for simultaneous manipulation and reliably release or separate the cords in response to a separating force exerted between them. In addition, the criteria of aesthetics and cost are particularly important in the competitive field of window coverings, in which purchasing decisions of designers, architects and users may turn on such factors, given solutions of comparable practical utility.

SUMMARY OF THE INVENTION

The invention features a novel and innovative device for releasably attaching at least two cords together, that permits a user to pull and release the cords simultaneously under normal operating conditions, but that allows the cords to be easily separated by a force applied between the cords. The device lends itself well to both aesthetic designs and well established manufacturing techniques suitable for mass production. The device is suitable for factory installation on new fixtures or may be easily installed by a user on existing blinds, curtains and the like. Thus, in accordance with one aspect of the invention, a device for releasably holding at least two cord ends includes an upper wall having an aperture for receiving a first cord and an elongated slot extending toward a bottom edge for releasably receiving a second cord. An engagement surface is provided below the aperture for retaining an enlarged region of the first cord. A biasing surface, spaced from the upper wall and at least partially below the slot, urges an enlarged region of the second cord into a stable position. Thus, the second cord is maintained in the stable position by the biasing surface and may be released from the device through the slot in response to a force tending to separate the first and second cords.

In accordance with another aspect of the invention, the device includes two shell members configured to mate generally in a mating region. Each shell member has an outer wall terminating at the mating region. The outer wall of the first shell member has recesses in the mating region generally facing the second shell member. The recesses at least partially define an aperture for receiving a first cord, a slot for releasably receiving a second cord and a biasing surface for urging the second cord into a stable position and permitting the second cord to escape from the device in response to a force tending to separate the first and second cords.

In accordance with another aspect of the invention, the device includes first and second inclined upper walls extending downwardly from a central apex region. The first upper wall has an aperture adjacent to the apex region for receiving a first cord. The second upper wall has a elongated slot extending along the length of the wall from a location adjacent to the apex region. A pair of lateral panels extend between the first and second inclined upper walls and terminate in a bottom region. The device further includes a biasing surface at least partially below the slot in the second upper wall. The biasing surface and the lateral panels define a cavity in the bottom region for receiving the second cord. The biasing surface urges the second cord into the cavity and permits the second cord to escape from the device via the elongated slot in response to a separating force applied to the first and second cords.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENTS

Before beginning the detailed description of the FIGURES and the preferred embodiments shown therein, several general comments will assist in understanding the scope of the invention.

The most preferred and illustrated embodiments of the present cord holding device include a generally triangular body or shell having an aperture for receiving and retaining a first cord and a slot for releasably receiving a second cord. The shell is generally hollow and is particularly well suited for mass production, as by injection molding a plastic material such as polyethylene or polypropylene. While this single-piece construction is presently preferred, it should be noted that the invention could also be constructed in two separate, mating shell halves joined along a mating surface. In such an embodiment, simple securing members may allow the shell halves to be assembled by pressing one against the other with at least the first cord positioned therebetween. Moreover, a variety of external designs and configurations may be envisaged depending upon the style and ornamentally desired, without departing from the scope and spirit of the appended claims.

Figure 1:
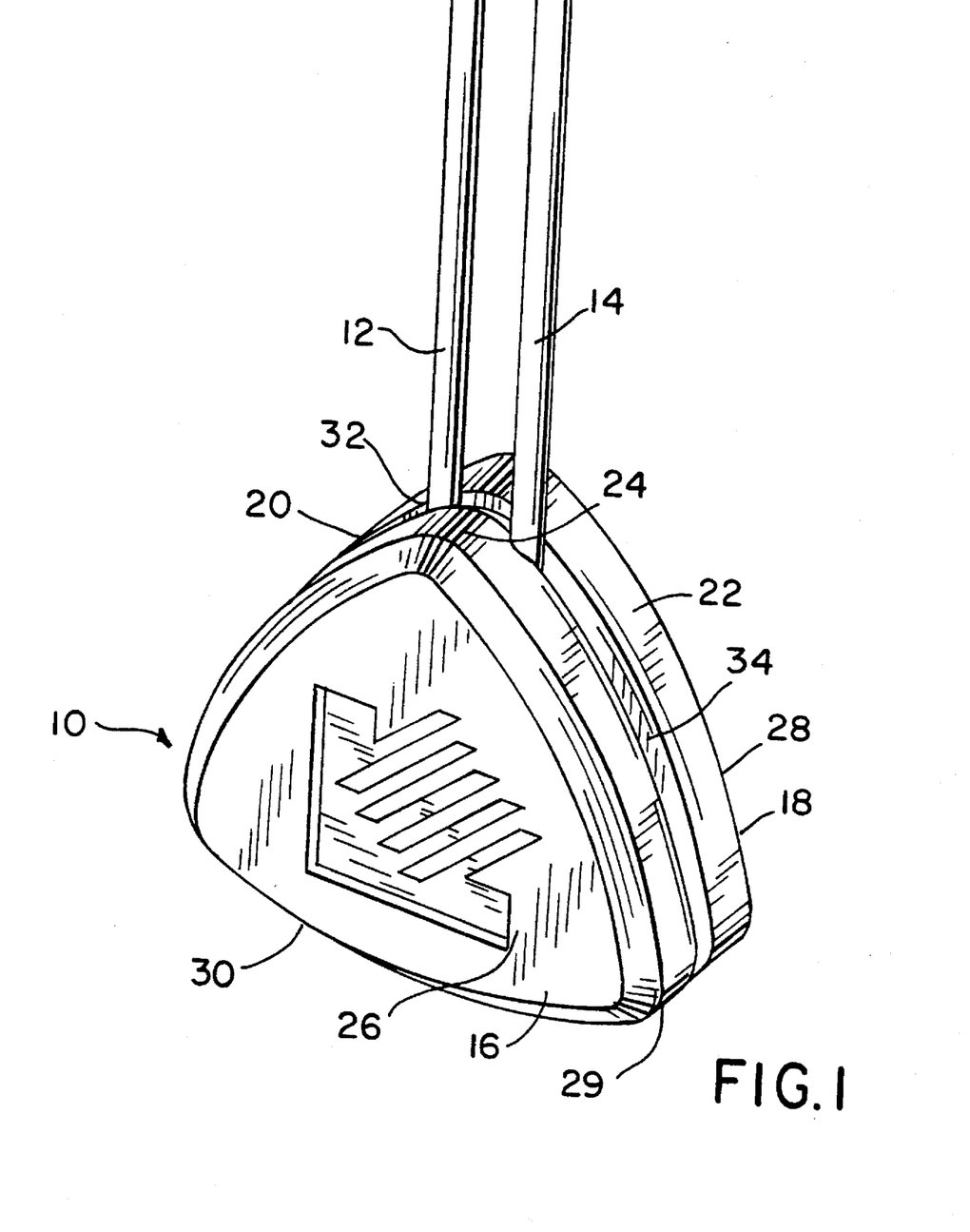
FIG. 1 is a top perspective view of a cord holding device in accordance with the invention.
Figure 2:
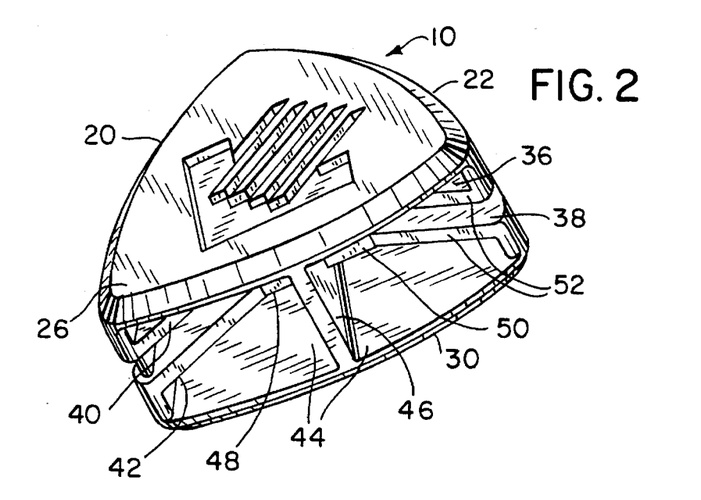
FIG. 2 is a bottom perspective view of the holding device of FIG. 1, showing the arrangement of internal ribs for contacting the enlarged ends of cords and allowing one cord to escape from the device.

Turning now to the drawings and referring first to FIG. 1, a device 10 is illustrated for releasably holding at least two cords 12 and 14. Device 10 includes first and second sides or shell halves 16 and 18, respectively, joined by first and second inclined upper walls 20 and 22 descending from an apex region 24. Sides 16 and 18 include lateral panels 26 and 28 which may include various aesthetic designs, contours, inscriptions and the like. Upper walls 20 and 22 and lateral panels 26 and 28 terminate in a bottom region 30 that may be fully or partially open as described below.

An aperture 32 is formed in upper wall 20 adjacent to apex region 24 for passage of first cord 12. Cord 12 is generally captured within aperture 32 as device 10 is installed on the cords, such that device 10 hangs from the cords with apex region 24 oriented upwardly as illustrated in the FIGURES. An elongated slot 34 extends along wall 22 from a point adjacent to apex region 24 to a bottom edge 29 in bottom region 30. In operation, second cord 14 is removably received in slot 34 and extends through slot 34 generally parallel to first cord 12 until pushed out of slot 34 by a separating force exerted between the cords.

As best illustrated in FIGS. 2, 4, 5 and 6, device 10 includes internal ribs 36 and 38 extending from upper walls 20 and 22 toward bottom region 30 and generally parallel to side panels 26 and 28. Ribs 36 and 38 include lower edges 40 and 42, respectively, bordering a lower cavity 44 in bottom region 30. A central rib 46 extends between side panels 26 and 28 from apex region 24 to bottom region 30. Lower edges 40 and 42 each include a generally horizontal portion divided by central rib 46 and forming an engagement surface 48 and a retaining surface 50. Lower edges 40 and 42 also include an inclined section extending between retaining surface 48 and bottom edge 29 to form an inclined biasing surface 52. The roles of engagement surface 48, retaining surface 50 and biasing surface 52 are discussed in greater detail below.

Figures 3, 4:
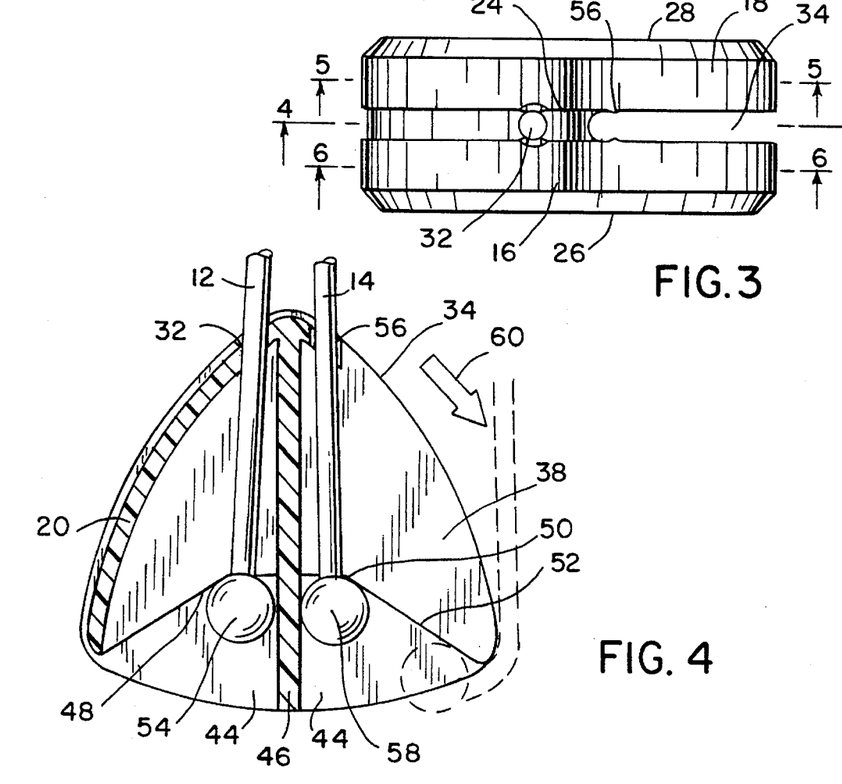
FIG. 3 is a top plan view of the device of FIG. 1.
FIG. 4 is a sectional view of the device of FIG. 1 through section 4—4 of FIG. 3.
Figure 5:
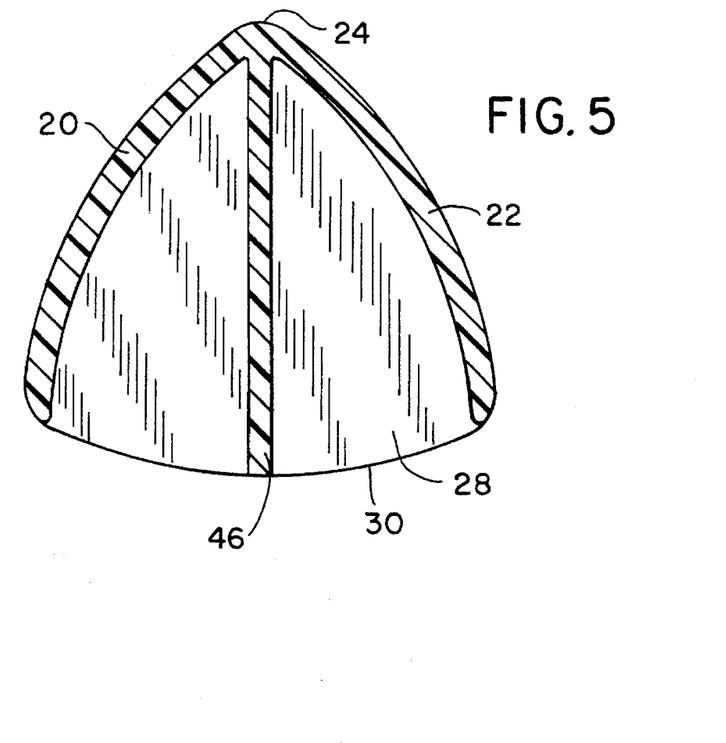
FIG. 5 is a sectional view of the device of FIG. 1 through section 5—5 of FIG. 3.
Figure 6:
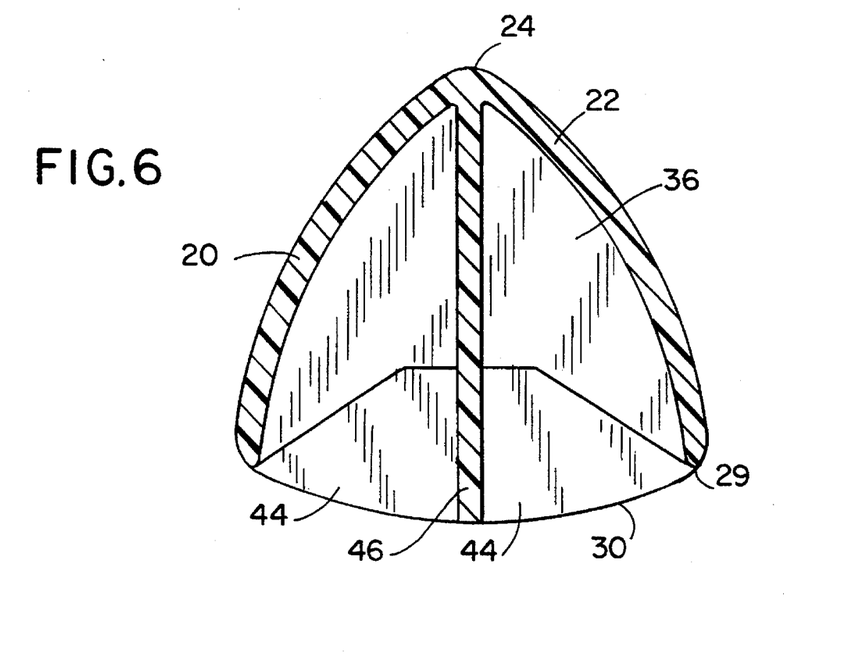
FIG. 6 is a sectional view of the device of FIG. 1 through section 6—6 of FIG. 3.
Figure 7:
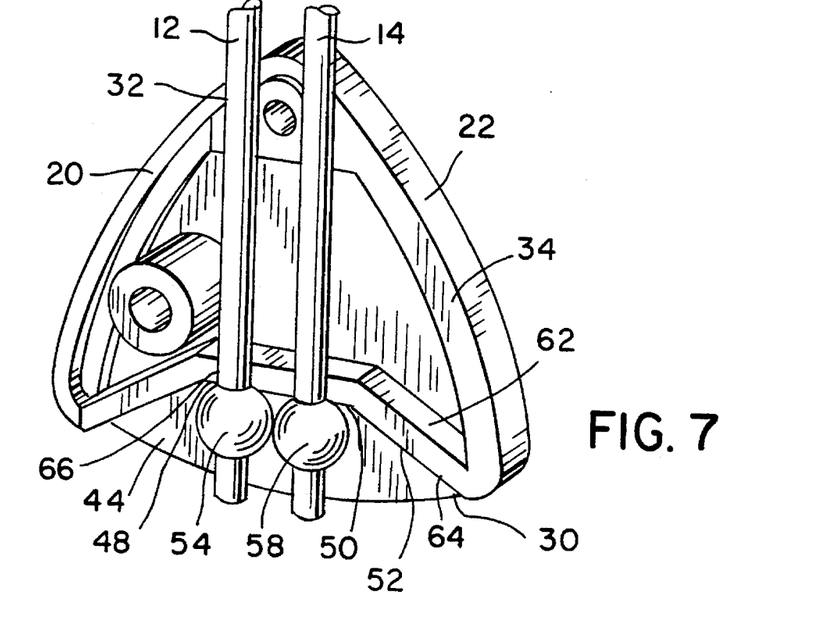
FIG. 7 is a sectional view of an alternative embodiment of a cord holding device in accordance with the invention.

As can be seen from FIG. 3, aperture 32 provides a passage for first cord 12 at a point adjacent to apex region 24. When inserted through aperture 32, first cord 12 extends between ribs 36 and 38 as illustrated in FIG. 4. Cord 12 preferably includes an enlarged region 54, such as a knot or crimped bead, that is formed or attached to cord 12 after insertion through aperture 32. Enlarged region 54 is housed within cavity 44 and engages and bears against engagement surface 48. Returning to FIG. 3, slot 34 extends from apex region 24 to bottom region 30 where it joins cavity 44. Protrusions 56 extend from sides 16 and 18 to narrow slot 34 in the vicinity of apex region 24 to aid in retaining second cord 14 once installed in device 10. As can be seen in FIG. 4, cord 14 also includes an enlarged region 58 that, in the stable position shown in solid lines in FIG. 4, contacts and bears against retaining surface 50. In this position, biasing surface 52 urges enlarged region 58 of cord 14 toward retaining surface 50 and cord 14 extends upwardly between ribs 36 and 38. When a force is exerted between cords 12 and 14 tending to separate the cords, as indicated by arrow 60 in FIG. 4, enlarged region 58 is guided downwardly along biasing surface 52 toward bottom edge 29 as illustrated in broken lines. Once enlarged region 58 passes bottom edge 29, cord 14 effectively escapes from device 10, which remains suspended from first cord 12 alone.

FIGS. 7 through 10 are sectional views of a series of alternative preferred embodiments of device 10. While the structures illustrated in FIGS. 8 and 9 could be formed in a single piece, as described above, the embodiments shown in FIGS. 7 and 10 would generally be made in two separate shell halves designed to be assembled by a user as described in detail below with reference to FIGS. 11 and 12. In the alternative embodiment depicted in FIG. 7, a single internal rib 62 is provided. Rib 62 partially encloses lower cavity 44 between the side panels 26 (not shown in FIG. 7) and 28, and includes an elongated recess 64 for releasably receiving cord 14 and a passage 66 for receiving cord 12. Recess 64 is contiguous with elongated slot 34 formed in the wall 22, such that cord 14 may escape from device 10 by downward movement in response to a separating force applied between cords 12 and 14.

Figure 8:
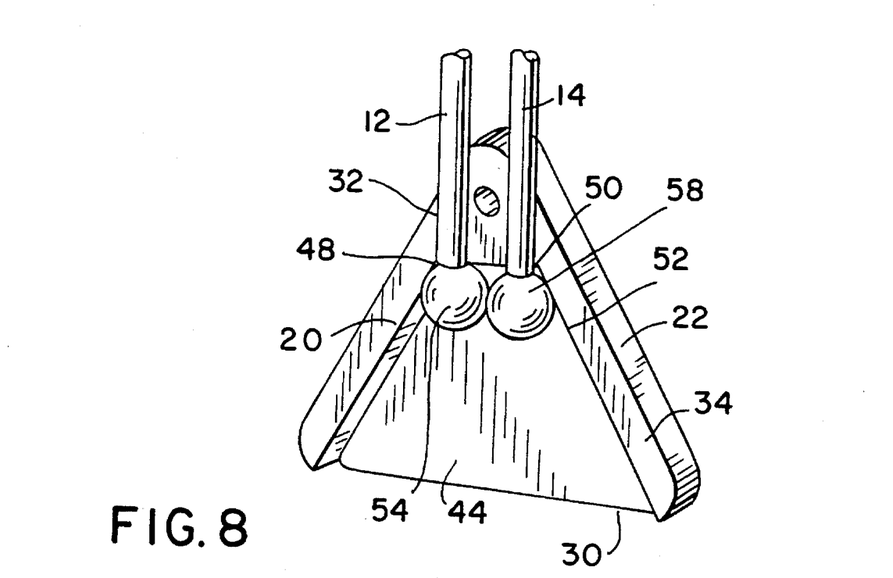
FIG. 8 is a sectional view of a second alternative embodiment in accordance with the invention.
Figure 9:
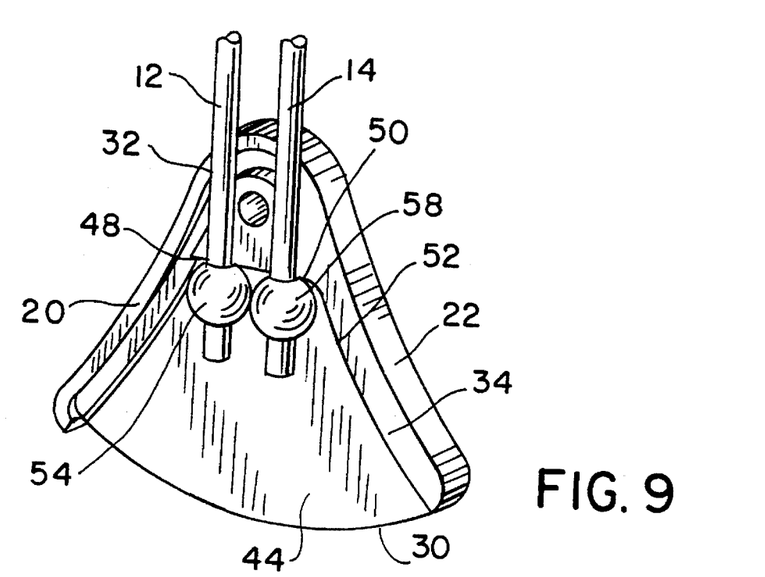
FIG. 9 is a sectional view of a third alternative embodiment of the device.
Figure 10:
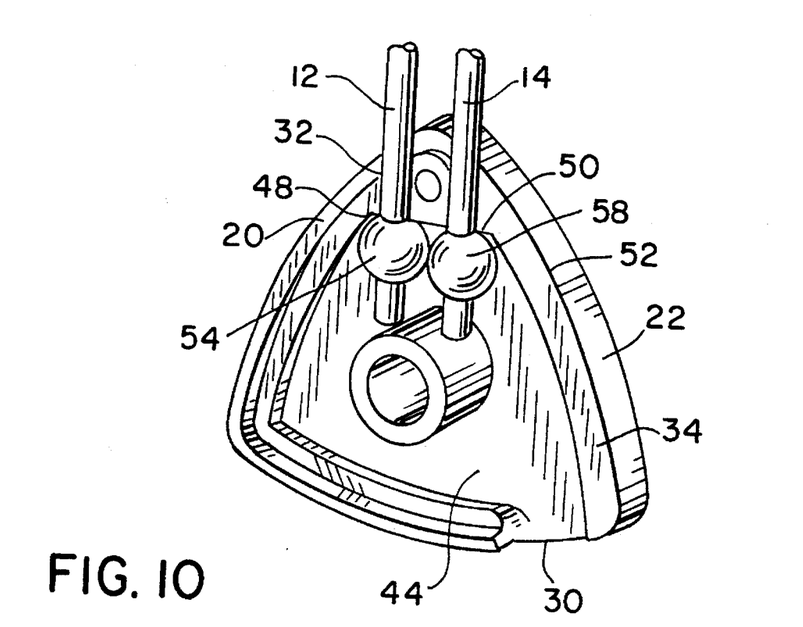
FIG. 10 is a sectional view of a further alternative embodiment of the device.

In the embodiments shown in FIGS. 8, 9 and 10, rather than an internal rib for retaining cords 12 and 14, the lower surfaces of wall sections 20 and 22 define engagement surface 48 for retaining first cord 12 as well as biasing surface 52 and retaining surface 50 for contacting enlarged end 58 of second cord 14 and urging it into the stable position shown. As discussed above, a separating force applied between cords 12 and 14 causes cord 14 to slide downwardly toward bottom region 30 along biasing surface 52 until enlarged end 58 escapes from cavity 44 to release cord 14 from device 10.

Figure 11:
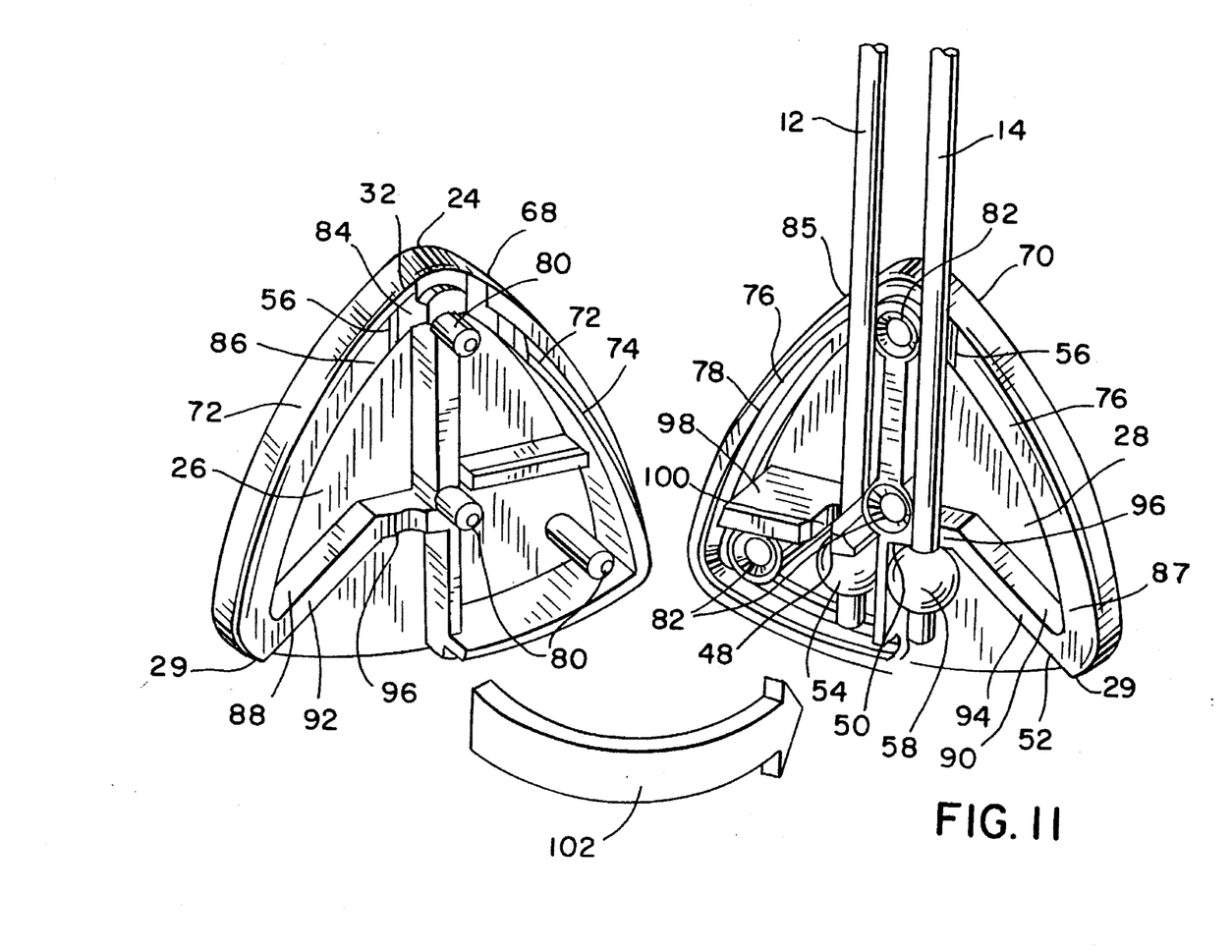
FIG. 11 is an exploded perspective view of further alternative embodiment in which the holding device is constructed of two mating shell halves.
Figure 12:
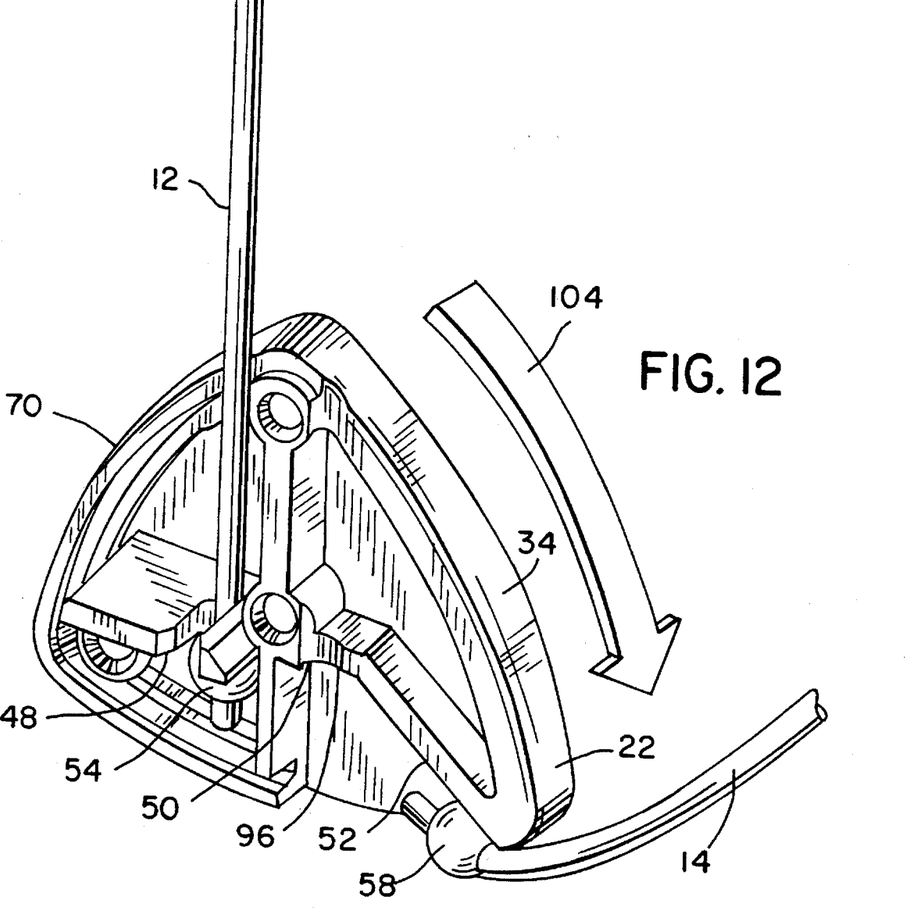
FIG. 12 is a perspective view of one of the shell halves illustrated in FIGS. 10, showing how one of the cords is released from the device.

A further embodiment of device 10 is illustrated in FIGS. 11 and 12. As mentioned above, device 10 may be constructed of two mating shell members or halves 68 and 70. Shell member 68 includes upstanding partitions or wall sections 72 extending from side panel 26. At least a portion of wall sections 72 terminates in a mating surface or land 74. Similarly, shell member 70 includes partitions or wall portions 76 extending from side panel 28 and at least partially terminating in a mating surface or land 78. Mating surfaces 74 and 78 are configured to conform to one another to form a unitary structure when members 68 and 70 are assembled in device 10.

While shell members 68 and 70 may be joined in any suitable manner, such as adhesively, by ultrasonic welding or with suitable fasteners, such as self-threading screws, in the preferred embodiment illustrated in the FIGURES, a locking arrangement is integrally molded into each member, permitting device 10 to be assembled by a user without adhesive or separate fasteners. This locking arrangement includes locking projections 80 extending from member 68 and corresponding locking apertures 82 formed in member 70. Apertures 82 are located and dimensioned to receive projections 80 in an interference fit sufficient to retain members 68 and 70 interlocked. In particular, locking projections 80 may be cylindrical pegs or pins having an outer diameter substantially equal to the inner diameter of locking apertures 82, such that shell members 68 and 70 may be conveniently press fitted together by hand for installation on cords 12 and 14.

In addition to mating surfaces 74 and 78, wall sections 72 and 76 include recessed areas defining functional features of device 10. Accordingly, generally semicircular recesses 84, 85 are formed in wall sections 72 and 76 to define aperture 32 in the assembled device. Similarly, elongated recesses 86, 87 are formed in members 68 and 70 to define elongated slot 34. In the embodiment illustrated in FIGS. 11 and 12, wall sections 72 and 76 merge at bottom edge 29 into inclined internal ribs 88 and 90 respectively. Ribs 88 and 90 include recessed areas 92 and 94 respectively, contiguous with recesses 86 and 87, such that ribs 88 and 90 define a second elongated slot therebetween in assembled device 10. Moreover, ribs 88 and 90 together define inclined biasing surface 52 and retaining surface 50. Ribs 88 and 90, together with side panels 26 and 28 partially enclose cavity 44, open along bottom region 30. Projections 56 extend from wall sections 72 and 74 to narrow elongated slot 34 slightly near apex region 24. Similar projections 96 extend from ribs 88 and 90 to narrow the passage defined between the ribs in assembled device 10.

A further internal rib 98 is formed in second shell member 70 generally in line with retaining surface 50. Rib 98 includes a passage 100 for receiving first cord 12. Rib 98 also defines lower engagement surface 48 for contacting and holding enlarged end 54 of cord 12. Passage 100 is vertically aligned with aperture 32, such that in assembled device 10, cord end 54 contacts engagement surface 48 and cord 12 extends between side panels 26 and 28 to exit through aperture 32.

This embodiment of device 10 is assembled as follows. Cord 12 is first positioned within shell member 70 as illustrated in FIG. 11, with enlarged end 54 lodged below internal rib 98 and cord 12 lying within recess 85. Because second cord 14 is releasably retained within device 10, it may be inserted into the device after assembly. With cord 12 thus positioned, shell members 68 and 70 are joined along mating surfaces 74 and 78 as indicated by arrow 102 and locking projections 80 are pressed into locking apertures 82. Second cord 14 is then inserted by positioning enlarged end 58 within cavity 44 and feeding cord 14 into elongated slot 34 and between ribs 88 and 90, beginning at bottom edge 29. Finally, cord 14 is secured in the stable position illustrated in FIG. 11 by pressing it past projections 56 and 96.

Thus installed, cord 14 may be released from device 10 as illustrated in FIG. 12. When a separating force is exerted between cords 12 and 14, cord 14 is urged past projections 56 and 96 and downwardly through slot 34 as indicated by arrow 104. At the same time, enlarged end 58 slides from retaining surface 50, down biasing surface 52 and exits from cavity 44 to release cord 14. With cord 14 thus freed, device 10 remains suspended on cord 12.

It has been found that the facility with which device 10 releases cord 14 in response to a separating force between the cords may be influenced by the particular geometry and weight distribution of the device. In particular, the cord releasing action is improved somewhat when biasing surface 52 and retaining surface 50 are located below the center of gravity of device 10. In addition, cord 14 is more easily released from device 10 as the angle of inclination of biasing surface 52 becomes less steep (i.e. approaches the horizontal). Accordingly, while upper wall 22 may define biasing surface 52 (as in the embodiments illustrated in FIGS. 8 through 10), biasing surface 52 is preferably spaced from upper wall 22 and inclined at a shallower angle (i.e. closer to the horizontal) than upper wall 22.

While the invention is susceptible to various modifications and alternative forms, specific embodiments have been shown and described by way of example in the foregoing drawings and detailed description. However, it should be understood that the invention is not intended to be limited to the particular forms disclosed. Rather, the invention is intended to cover all modifications, equivalents and alternatives falling within the spirit and scope of the invention as defined by the appended claims.

What is claimed is:

1. A device for releasably holding at least two cords, each cord having an enlarged region for engagement in the device the device comprising:

an upper wall having an aperture for receiving a first cord and an elongated slot extending toward a bottom edge for releasably receiving a second cord;

an engagement surface below the aperture for retaining the enlarged region of the first cord; and a biasing surface spaced from the upper wall and at least partially below the slot for urging the enlarged region of the second cord into a stable position, whereby the second cord is maintained in the stable position by the biasing surface and is releasable through the slot in response to a force tending to separate the first and second cords.

2. The device of claim 1 wherein the device has a center of gravity above the engagement surface and the biasing surface.

3. The device of claim 1 wherein the biasing surface is inclined toward the bottom edge.

4. The device of claim 3 wherein the elongated slot is substantially inclined at a first angle from vertical and the biasing surface is inclined in the same direction as the slot and at a second angle from vertical greater than the first angle.

5. The device of claim 1 wherein the device includes an open bottom region for receiving the enlarged portion of the second cord when the second cord is in the stable position.

6. The device of claim 1 wherein the slot includes a region of reduced width for releasably retaining the second cord in the stable position.

7. The device of claim 1 further comprising a substantially horizontal retaining surface adjacent to the biasing surface for contacting the enlarged region of the second cord in the stable position.

8. A device for releasably holding at least two cords comprising first and second shell members configured to mate generally in a mating region, each shell member having an outer wall terminating at the mating region, the outer wall of the first shell member having recesses in the mating region generally facing the second shell member, the recesses at least partially defining an aperture for receiving a first cord, a slot for releasably receiving a second cord and a biasing surface for urging the second cord into a stable position and permitting the second cord to escape from the device in response to a force tending to separate the first and second cords.

9. The device of claim 8 wherein one of the shell members includes a locking projection and the other shell member includes a locking aperture configured to cooperate with the locking projection to secure the shell members together along the mating region.

10. The device of claim 8 wherein the second shell members includes recesses generally facing the recesses of the first shell member to define the aperture, the slot and the biasing surface.

11. The device of claim 8 wherein first shell member includes an internal rib extending toward the second shell member, the recess at least partially defining the biasing surface being provided in the rib.

12. The device of claim 8 wherein the first and second shell members each include an internal rib disposed in mutually facing relation, the internal ribs including recesses defining the biasing surface.

13. The device of claim 8 wherein the first shell member is substantially a mirror image of the second shell member.

14. The device of claim 8 wherein the first and second shell members are made of a moldable plastic material.

15. A device for releasably holding at least two cords comprising:

first and second inclined upper walls extending downwardly from a central apex region, the first upper wall having an aperture adjacent to the apex region for receiving a first cord and the second upper wall having a elongated slot extending along the length thereof from a location adjacent to the apex region;

a pair of lateral panels extending between the first and second inclined upper walls and terminating in a bottom region; and a biasing surface at least partially below the elongated slot, the biasing surface and the lateral panels defining a cavity for receiving the second cord, the biasing surface urging the second cord into the cavity and permitting the second cord to escape from the device via the elongated slot in response to a separating force applied to the first and second cords.

16. The device of claim 15 wherein the biasing surface includes a second elongated slot in communication with the elongated slot in the second upper wall.

17. The device of claim 15 wherein the device includes first and second mating halves made of a moldable plastic material and joined along a mating region.

18. The device of claim 15 wherein the device is a single piece structure made of a moldable plastic material.

19. The device of claim 15 wherein the second inclined upper wall includes at least one projection extending into the elongated slot.

20. The device of claim 15 further comprising a retaining surface adjacent to the biasing surface.

* * * * *